(No Model.)
W. B. POTTER.
ELECTRIC BRAKE.
No. 551,785.  Patented Dec. 24, 1895.
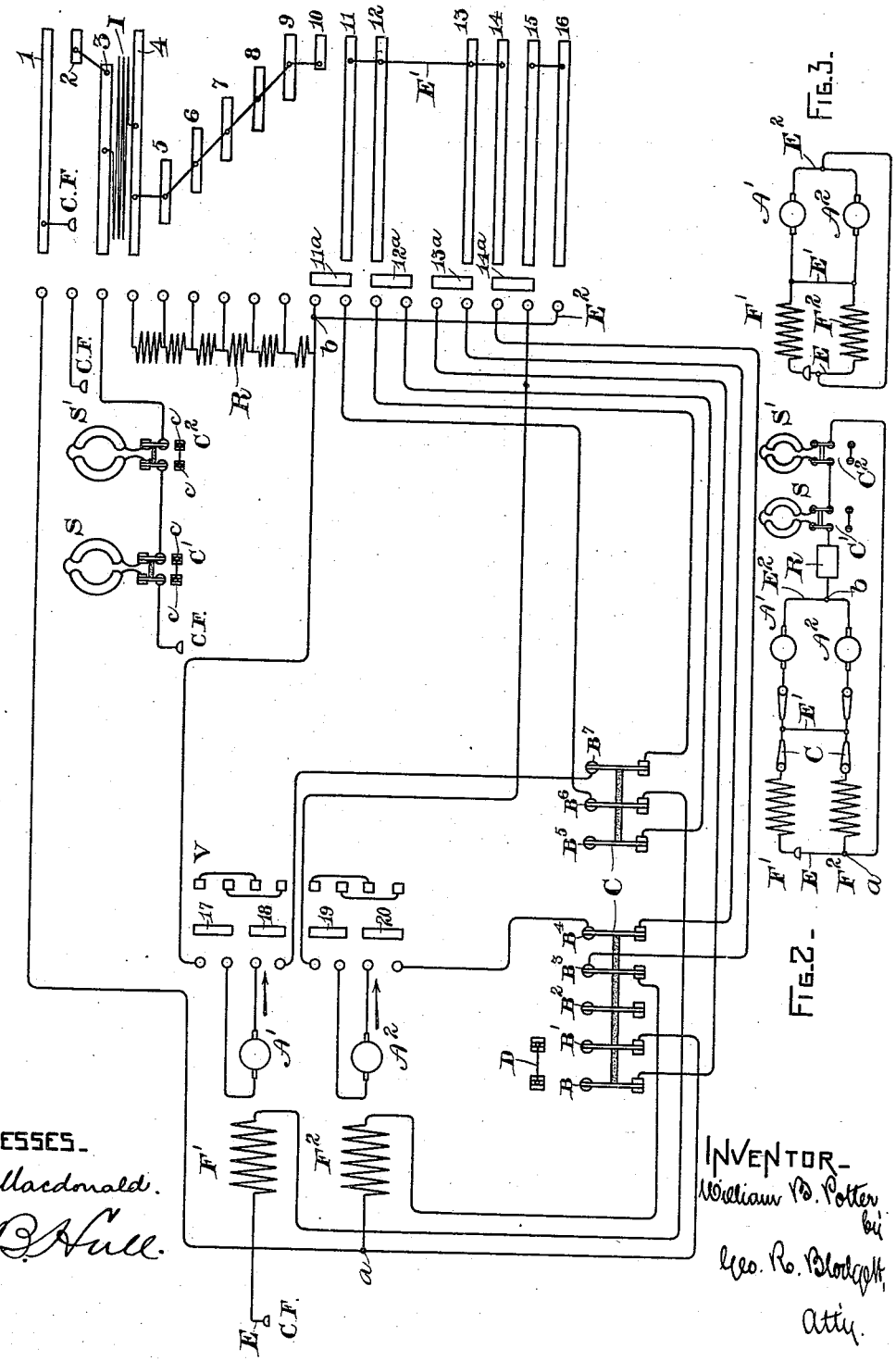
Witnesses_
A. F. Macdonald.
D. B. Hull.
Inventor_
William B. Potter
by
Geo. R. Blodgett
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

ELECTRIC BRAKE.

SPECIFICATION forming part of Letters Patent No. 551,785, dated December 24, 1895.

Application filed March 30, 1895. Serial No. 543,803. (No model.)

*To all whom it may concern:*

Be it known that I, WILLIAM B. POTTER, a citizen of the United States, residing at Schenectady, in the county of Schenectady, State of New York, have invented certain new and useful Improvements in Electric Brakes, of which the following is a specification.

My invention relates to electric brakes, and has for its object to provide an arrangement of circuits and of apparatus by which the effect of a plurality of motors when converted into generators and used to operate a plurality of brake-shoes may be made more uniform and reliable. For this purpose I arrange the fields of the motors and also their armatures in multiple, and across the leads from the armatures and from the fields I place equalizers, so that each end of the armatures is connected and each end of the fields is also connected, the motors thus connected as a whole feeding current into a local circuit including a variable resistance and a plurality of brake-shoes. With the apparatus as thus arranged I also combine an "emergency-stop," actuated in a certain definite position of the controller, preferably in the final position to which the braking switch or controller may be thrown, so that in case of emergency—as when an obstacle is upon the track—the motorman may throw the handle of his brake-switch to its final position, with the assurance that he has done everything possible to stop the car. By preference this emergency-stop is arranged to cut out the brake-shoes and resistance altogether, leaving the motors short-circuited upon themselves without resistance. This practically instantaneously stops the rotation of their armatures; but as soon as the armatures are stopped the current falls off, the resistance to motion diminishes, and the car-wheels begin again to revolve. With this revolution the current again increases in the short circuit and the motors are again brought up sharply. This action is extremely severe, and is of course only to be used in case of danger to the car or to some outside object, but is also proportionately effective in stopping momentum, as it does away with the slipping or "skidding" of the wheels. In the apparatus I also arrange cut-out switches for the brake-shoes independent of any other switches, and by this means I am enabled to cut out a defective shoe without impairing the operation of the remainder of the apparatus. I also arrange cut-out switches in the circuits of the motors, so that a defective motor may be cut out in the same way. The arrangement of the brake-shoes is illustrated and described as a series arrangement. So far as I am aware, brake-shoes have hitherto been arranged in multiple, as this causes the least drop of potential across each shoe between the source of current and the ground. I have found important advantages from arranging the shoes in series. The greatest of these advantages is that the proper relation of braking effect between the motors themselves and the different shoes in the train is preserved. As an illustration, suppose that there be five ampères in the motor and five ampères in each brake-shoe as giving the best effect. The ampèrage remains approximately constant in this arrangement, the potential necessary to drive the current through different amounts of resistance included in the circuit by including a greater or less number of brake-shoes in series varying as required. This is an especial advantage, inasmuch as the number of ampères obtainable from the ordinary railway-motor driven by momentum is comparatively limited, while its voltage may run up to a very high point without injury. In practice if a sufficient amount of current be taken from a railway-motor to supply a large number of shoes in multiple its destruction would be almost inevitable. Another objection to the multiple arrangement which is obviated by that in series is that where the ampères rise rapidly the motor acts with more energy to brake the train than do the brake-shoes, and the train, as it is expressed among railway-men, "piles up" on the motor-car. This may become dangerous in braking when running around a curve, where the tension of the train must be preserved.

Another advantage which I have found for the shoes arranged in series is that the leads between the different cars, and, in fact, the leads to convey current throughout the system, may be of the same size, as the current will be substantially alike at all points of the system, whereas when shoes are connected up in multiple the leads must all be proportioned for the greatest number of cars that may ever be put together on one train, while to obtain economy of distribution it would be necessary to make the leads of the car nearest the engine or electric locomotive ten times as large as the tenth car back need be. This leads to either waste of copper or waste of current. Ordinarily the waste of current is preferred, but in any event the copper conductors must be kept of such a size as not to burn out under the load or to become unduly heated, and no matter of what size they are made the risk of burning out the motor is not lessened.

The accompanying drawings show diagrammatic embodiments of my invention. The controller in which I prefer to embody it is like that shown in Patent No. 546,247, issued to me September 10, 1895. I have therefore not illustrated it in full, the brake-switch resembling that shown therein, and the other parts not being illustrated, as there is no change in their construction.

Figure 1 of the drawings is a general diagram of the circuits, the brake-switch being shown developed in plane. Fig. 2 is a diagram showing the operation of the motors and brake-shoes and their connections in a form more readily understood. Fig. 3 shows the circuits as they appear when the emergency-stop is in operation.

A is the brake-switch or brake-controller, provided with contact-plates 1 to 16 inclusive.

$A'$ $A^2$ are the armatures of the motors, $F'$ $F^2$ being the fields.

S S' are the braking-magnets.

C C are the cut-out switches for the motors.

$C'$ $C^2$ are corresponding switches for the braking-magnets.

B to $B^7$ indicate the blades of the cut-out switches C C, and D is a set of cross-connected contacts co-operating with one of the switches.

At V, I have indicated the usual reversing-switch in which only one set of contacts is numbered, the other set operating in the well-known way to reverse the relation of armature and field and permit the backward rotation of the motors.

R is a resistance in series with the two motors.

At C F, I have indicated certain connections made to the controller-frame in the manner pointed out and claimed in my application above referred to.

Except for the equalizer connections E E' $E^2$, the arrangement is like that of my former application, but in addition to the two contact-plates operating the resistance in the way therein pointed out I provide at 2 an auxiliary contact-plate acting to make direct short circuit between one side of the armatures and the other side of the fields, thus throwing the motors into the condition shown in Fig. 3.

The circuits in the apparatus are as follows: Starting from the armature $A^2$, passing in the direction of the arrow, the current passes to the contact-plate 20 upon the reversing-switch V, thence to the switch-blade $B^4$, then to the contact-plate 13 upon the brake-switch A, by cross connection to the contact-plate 14, to the switch-blade $B^3$, thence through the field $F^2$ to the point $a$, then by the lead to the contact-plate 1 upon the brake-switch A, thence to the controller-frame at C F. The other path of the current from the point $a$ is open-circuited upon the blade B' of the switch. The current from the other armature A' passes likewise to the contact-plate 18 upon the reversing-switch V, thence by the lead to the blade $B^7$ of the cut-out switch, then to the contact-plate 12 upon the brake-switch A, by cross connection to the contact-plate 11, thence by the lead to the blade $B^6$ of the cut-out switch, thence through the field F' to the controller-frame. It will be seen that the current from the armature $A^2$ passes to the contact-plate 13, while that from the armature A' passes to the contact-plate 12. These two plates are joined by a cross connection, so that at this point the current is joined. The current re-enters at the controller-frame adjacent to the brake-magnets S, passes through those magnets to the contact-plate 3, through the blow-out coil I, thence through the resistance R to the point $b$. At this point it passes to the left over the lead to the contact-plate 17 upon the reversing-switch V, and back to the armature A'; and from the point $b$ it also passes to the contact-plate 16 upon the brake-switch A, by cross connection to the contact-plate 15, thence to the contact-plate 19 upon the reversing-switch V, back to the armature $A^2$. The contacts 4 to 10, inclusive, by the rotation of the cylinder cut out more or less of the resistance to vary the braking effect. The equalizer E, connecting one end of the two field-magnet coils, consists in part of the lead to which the connection $a$ is made and in part of the controller-frame. The equalizer E' is the connection between the contact-plates 12 and 13 upon the brake-switch A, while the equalizer $E^2$ is the lead from the point $b$ to the contact-plate 16. It is to be understood that the contacts $11^a$ to $14^a$ have the usual office of connecting the controller and the brake-switches, as in my application already referred to. So also the cut-out switches C C are found therein fully described. The cut-out switches $C'$ $C^2$ connected with the braking-coils, however, are illustrated particularly in Fig. 1, and consist each of a double-pole switch provided with a pair of cross-connected contacts $c$ $c$. When the switch is thrown so as to connect with these cross-connected contacts, the path of the current would of course go through it in that way, and the braking-magnet coil will be cut out.

When the emergency-stop, preferably operated only by the last position of the brake-switch, is put on, the different circuits are as before, except that the resistance is all cut out, the lowest brush of the resistance resting upon the contact-plate 10, and the lowest brush shown being connected to that brush and resting upon the contact-plate 16, so that the brake-shoes will also be cut out, and the current, instead of entering at the controller-frame to the lead connected with the brake-shoe, will enter from the controller-frame to the contact-plate 2.

The use of the equalizers prevents one motor building up at the expense of the other or faster than the other, and therefore prevents, in the application of the brake, the "bucking" of one motor against the other.

What I claim as new, and desire to secure by Letters Patent of the United States, is—

1. In an electric braking apparatus, a plurality of electric motors arranged in multiple, equalizing connections connecting similar terminals of the field-magnet coils at each end of such coils, and equalizing connections connecting similar terminals upon both sides of the armatures, in combination with braking-magnets in circuit with the motors.

2. In an electric braking apparatus, a plurality of electric motors having equalizing connections across similar terminals of the field-magnets and the armatures at each end thereof, in combination with brake-magnets and a resistance included in the local circuit with the motors.

3. In an electric braking apparatus, a plurality of electric motors arranged in multiple with their field-magnet and armature terminals at each end thereof respectively connected by equalizing connections, in combination with brake-magnets arranged in series in a local circuit with the motors.

4. In combination, a plurality of electric motors, means adapted to cut out either one of the motors at will, a plurality of brake-magnets arranged in series, means for cutting out individual brake-magnets without interrupting the continuity of the circuit, and a local circuit including the motors and brake-magnets.

5. In an electric braking apparatus, a plurality of electric motors arranged in multiple and provided with equalizing connections for similar terminals of their field-magnets and armatures, a local circuit and regulable resistance in the local circuit, a plurality of brake-magnets arranged in series with the resistance and the motors in the local circuit, and means for cutting out either of the motors or of the brake-magnets without interrupting the continuity of the circuit.

6. In combination, a dynamo-electric armature, brake-magnets actuated thereby, means for regulating the current supplied to the brake-magnets by the armature, and means for cutting out the brake-magnets and short-circuiting the armature upon itself.

7. In an electric braking apparatus and in combination, a motor or motors furnishing current when driven by the momentum of a moving vehicle, a local circuit for such motors, brake-magnets in the local circuit, a controller and a resistance also in the local circuit, contacts and cross-connections upon the controller adapted to vary the amount of resistance in circuit or to open the circuit, and auxiliary contacts and cross-connections arranged to cut-out the brake-magnets and resistance and to short-circuit the motor upon itself at a certain definite position of the braking controller.

8. In combination, a motor or motors furnishing current when driven by the momentum of a car, a controller for regulating the action of the current in the braking apparatus, and contacts and cross-connections upon the controller acting to short-circuit the motors and cut out the braking magnets and thus apply an emergency stop at a certain definite position in its rotation.

9. In combination, a plurality of motors, a brake-magnet, a local circuit including the brake-magnet and the motors, the motors being provided with equalizers for their fields and armatures, a controller regulating the action of the current supplied by the motors when driven by the momentum of the moving vehicle, contacts and cross-connections upon the controller regulating the braking action, and auxiliary contacts and cross-connections cutting out the braking apparatus and short-circuiting the motors upon themselves without resistance in the last position only of the braking-switch or controller.

In witness whereof I have hereunto set my hand this 26th day of March, 1895.

WILLIAM B. POTTER.

Witnesses:
B. B. HULL,
A. F. MACDONALD.